(12) United States Patent
Kobe et al.

(10) Patent No.: US 9,790,833 B2
(45) Date of Patent: Oct. 17, 2017

(54) MIXER AND MIXING DEVICE FOR AN EXHAUST SYSTEM

(71) Applicant: Eberspächer Exhaust Technology GmbH & Co. KG, Neunkirchen (DE)

(72) Inventors: Jürgen Kobe, Nürtingen-Raidwangen (DE); Felix Hackländer, Esslingen (DE); David Binder, Esslingen (DE); Frank Berkemer, Eningen u.A. (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 122 days.

(21) Appl. No.: 14/808,170

(22) Filed: Jul. 24, 2015

(65) Prior Publication Data

US 2016/0032809 A1 Feb. 4, 2016

(30) Foreign Application Priority Data

Jul. 31, 2014 (DE) .................. 10 2014 215 083

(51) Int. Cl.
| | | |
|---|---|---|
| *F01N 3/00* | (2006.01) | |
| *F01N 3/28* | (2006.01) | |
| *F01N 3/20* | (2006.01) | |
| *B01F 5/06* | (2006.01) | |
| *B01F 3/04* | (2006.01) | |

(52) U.S. Cl.
CPC ........ *F01N 3/2892* (2013.01); *B01F 3/04049* (2013.01); *B01F 5/0614* (2013.01); *B01F 5/0616* (2013.01); *F01N 3/2066* (2013.01); *B01F 2005/0622* (2013.01); *B01F 2005/0637* (2013.01); *B01F 2005/0639* (2013.01); *F01N 2240/20* (2013.01); *F01N 2610/02* (2013.01); *Y02T 10/24* (2013.01)

(58) Field of Classification Search
CPC ...... B01F 2005/0622; B01F 2005/0637; B01F 2005/0639; B01F 3/04049; B01F 5/0614; B01F 5/0616; F01N 2240/20; F01N 2610/02; F01N 3/2066; F01N 3/2892; Y02T 10/24
See application file for complete search history.

(56) References Cited

U.S. PATENT DOCUMENTS

| | | | |
|---|---|---|---|
| 1,974,110 A * | 9/1934 | Higley | ............... F15D 1/04 138/39 |
| 4,600,544 A | 7/1986 | Mix | |
| 4,848,920 A | 7/1989 | Heathe et al. | |

(Continued)

FOREIGN PATENT DOCUMENTS

| | | |
|---|---|---|
| DE | 100 60 808 A1 | 7/2002 |
| DE | 10 2007 012 790 A1 | 9/2008 |

(Continued)

*Primary Examiner* — Jesse Bogue
(74) *Attorney, Agent, or Firm* — McGlew and Tuttle, P.C.

(57) ABSTRACT

A mixer (19), for an exhaust system (7) for mixing and/or evaporating a liquid (13) in an exhaust gas flow (8), especially for an SCR system (9), includes a plurality of guide blades (21) arranged in a star-shaped pattern. Simplified manufacturability of the mixer (19) is achieved if the guide blades (21) are connected each with a centrally arranged core (23) radially on the inside and if the guide blades (21). The guide blades (21) and the core (23) are formed by an integral cast part (24).

21 Claims, 4 Drawing Sheets

(56) References Cited

U.S. PATENT DOCUMENTS

| | | | | |
|---|---|---|---|---|
| 6,158,412 A * | 12/2000 | Kim | ................ | F02M 29/06 123/306 |
| 7,104,251 B2 * | 9/2006 | Kim | ................ | F01N 13/08 123/306 |
| 7,198,763 B2 | 4/2007 | Holm-Christensen | | |
| 7,543,561 B2 * | 6/2009 | Shibata | ................ | B01D 45/16 123/306 |
| 7,784,273 B2 * | 8/2010 | Kanaya | ................ | B01D 53/9431 60/286 |
| 8,572,949 B2 * | 11/2013 | Wirth | ................ | B01F 3/022 181/269 |
| 8,826,649 B2 * | 9/2014 | Li | ................ | F01N 3/2892 138/37 |
| 2008/0134671 A1 * | 6/2008 | Nefischer | ................ | B01D 53/90 60/300 |
| 2008/0232190 A1 | 9/2008 | Schneider | | |
| 2009/0165447 A1 * | 7/2009 | Hiranuma | ................ | F01N 3/106 60/295 |
| 2011/0016856 A1 * | 1/2011 | Wirth | ................ | B01F 3/04021 60/317 |
| 2013/0333363 A1 * | 12/2013 | Joshi | ................ | F01N 3/208 60/301 |
| 2014/0069087 A1 * | 3/2014 | Vanvolsem | ................ | B01D 53/90 60/319 |
| 2015/0016214 A1 * | 1/2015 | Mueller | ................ | B01F 5/0616 366/337 |
| 2016/0265407 A1 * | 9/2016 | Fukui | ................ | F01N 3/2066 |

FOREIGN PATENT DOCUMENTS

| | | |
|---|---|---|
| DE | 10 2011 111 765 A1 | 2/2013 |
| EP | 1 099 469 A1 | 5/2001 |
| EP | 1 754 530 A1 | 2/2007 |
| EP | 2 278 133 A2 | 1/2011 |
| FR | 2 921 415 A1 | 3/2009 |
| WO | 97/35107 A1 | 9/1997 |
| WO | 2009/054711 A1 | 4/2009 |
| WO | 2011/010850 A2 | 1/2011 |

* cited by examiner

MIXER AND MIXING DEVICE FOR AN EXHAUST SYSTEM

CROSS REFERENCE TO RELATED APPLICATIONS

This application claims the benefit of priority under 35 U.S.C. §119 of German Patent Application DE 10 2014 215 083.3 filed Jul. 31, 2014, the entire contents of which are incorporated herein by reference.

FIELD OF THE INVENTION

The present invention pertains to a mixer for an exhaust system for mixing and/or evaporating a liquid in an exhaust gas flow, especially for an SCR system, and more particularly to a mixer having a plurality of guide blades arranged in a star-shaped pattern. The present invention also pertains to a mixing device equipped with such a mixer for an exhaust system. Finally, the present invention also pertains to a method for manufacturing such a mixing device.

BACKGROUND OF THE INVENTION

It is necessary for a number of applications to evaporate a liquid in a gas flow and to mix the evaporated liquid with the gas flow. For example, the introduction of a liquid fuel into the exhaust gas flow is considered for use in exhaust systems of internal combustion engines, for example, in order to bring about a rise in temperature in the exhaust system by means of a catalytic converter arranged downstream. Further, SCR systems are known in which a reducing agent is introduced into the exhaust gas flow upstream of an SCR catalytic converter, where SCR denotes Selective Catalytic Reduction. The reducing agent is preferably introduced in the liquid form and must evaporate as extensively as possible until it reaches the SCR catalytic converter and must be mixed with the exhaust gas flow as homogeneously as possible. An aqueous urea solution is typically considered for use as the reducing agent. The urea can be converted into ammonia and carbon dioxide in the process by thermolysis and subsequent hydrolysis. Reduction of nitrogen oxides into nitrogen and water can thus be achieved in the SCR catalytic converter.

Mixers or mixing devices of the type mentioned in the introduction are used to improve the evaporation and mixing of the respective liquid in the respective gas flow.

A mixer, which has a plurality of guide blades arranged in a star-shaped pattern, is known from DE 10 2011 111 765 A1. All guide blades are separate shaped sheet metal bodies, which are inserted in a star-shaped pattern into a cylindrical retaining ring and are welded to the retaining ring radially on the outside. All guide blades are connected with one another via a central weld joint radially on the inside. The effort needed to manufacture such a mixer is comparatively great, because a plurality of individual parts must be assembled and fitted together.

SUMMARY OF THE INVENTION

An object of the present invention is to provide an improved embodiment, which can be manufactured in a comparatively especially simple manner, for a mixer of the above-mentioned type or for a mixing device equipped therewith.

According to the invention, a mixer is provided for an exhaust system for mixing and/or evaporating a liquid in an exhaust gas flow, in particular for an SCR system. The mixer comprises a plurality of guide blades arranged in a star-shaped pattern and a centrally arranged core. The guide blades are each connected, at a radially inner side, with the centrally arranged core, wherein the guide blades and the core are formed as an integral cast part.

The present invention is based on the general idea of manufacturing the mixer with all its guide blades as a one-part cast part. The manufacture of the cast part comprising all guide blades from a uniform material from one piece reduces the effort needed for manufacture, because a complicated assembly of a plurality of individual parts is eliminated. To make it possible to manufacture such a cast part with guide blades formed integrally thereon, the present invention proposes that the mixer be equipped with a central core, from which all guide blades start in a star-shaped pattern. Thus, all guide blades are connected with said core radially on the inside. By providing such a core, it is possible to provide an injection mold, by means of which the mixer can be injection molded and from which the mixer can be removed in a comparatively simple manner.

Further, a retaining ring enclosing the guide blades or the like can be eliminated. Corresponding to an advantageous embodiment, the guide blades may be arranged in a self-supporting manner radially on the outside. This measure also leads to an extreme simplification concerning the manufacturability of the injection-molded mixer, because removal from a corresponding injection mold is possible in an especially simple manner because of the guide blades being self-supporting radially on the outside.

According to another embodiment, the core may have a diameter that is larger than a wall thickness of the guide blades. As a result, the core has a comparatively large mass and correspondingly a relatively high heat capacity. As a result, the evaporating capacity of the guide blades for liquid impacting on them can be improved, because a comparatively large amount of heat can be supplied from the core. For example, the diameter of the core is at least twice or at least four times the wall thickness of a guide blade. All guide blades preferably have an identical design.

The guide blades may be connected with the core over their entire axial length in another embodiment. This results in an especially favorable heat transmission between the core and the guide blades. Furthermore, the injection molding of the cast part becomes simpler.

Another embodiment is based on the fact that the core projects axially over the guide blades at at least one axial end of the mixer. In particular, the core may project axially over the guide blades, i.e., over the leading edges thereof, on the incoming flow side. This mode of construction has aerodynamic advantages and reduces the flow resistance of the mixer. The area of the core projecting axially on the incoming flow side may be profiled especially aerodynamically, for example, in a drop-shaped or hemispherical or conical shape.

An incoming flow-side ring, which is connected with all guide blades at the leading edges thereof, may be provided in another advantageous embodiment. The incoming flow-side ring leads to intensive stiffening or stabilization of the guide blades, as a result of which the mixer as a whole will have a greater stability. The incoming flow-side ring is especially advantageous when the guide blades are otherwise arranged in a radially self-supporting manner. The incoming flow-side ring is now located distally from the core and preferably in the area of an outer circumference of the mixer. In particular, the incoming flow-side ring is arranged in the area of radially outer ends of the guide blades on the incoming flow side. The incoming flow-side ring may be arranged flush with leading edges of the guide blades.

This incoming flow-side ring leads, besides, to a reduced flow resistance of the mixer, and what is important for this effect is not whether the incoming flow-side ring is formed integrally with the cast part or whether the incoming flow-side ring is connected with all guide blades or whether a core is present or whether the guide blades are formed on a cast part. Consequently, another means for accomplishing the object of the present invention is characterized in that the mixer having a plurality of guide blades arranged in a star-shaped pattern has an incoming flow-side ring, which is arranged in the area of leading edges of the guide blades and in the area of an outer circumference of the mixer. Provisions may optionally be made now for the guide blades to be connected each with a centrally arranged core radially on the inside. Further, provisions may be made, in addition or as an alternative, for the incoming flow-side ring and the guide blades, as well as optionally the core, to be formed by an integral cast part.

Corresponding to an advantageous variant, the incoming flow-side ring may be formed integrally with the cast part. The incoming flow-side ring is thus also formed from a uniform material with the guide blades and the core in the cast part.

In another variant, the incoming flow-side ring may have, at right angles to the circumferential direction, a profile, which is round on the incoming flow side and on the outgoing flow side and has a larger rounding radius on the incoming flow side than on the outgoing flow side. This results in an aerodynamic contouring for the incoming flow-side ring in the profile, which can be used to reduce the flow resistance of the mixer. In particular, the cross-sectional profile may be designed as a drop profile or as an airfoil.

Especially advantageous in an embodiment in which the cross-sectional profile of the incoming flow-side ring is selected to be such that it deflects a gas flow flowing around the incoming flow-side ring radially inwardly. It was found that such a deflection of the edge flow radially inwardly leads to a significant reduction of the flow resistance of the mixer.

According to another advantageous embodiment, an outgoing flow-side ring may be provided, which is connected with all guide blades at the leading edges thereof. In particular, this outgoing flow-side ring may be arranged radially on the outside on the mixer, i.e., in the area of an outer circumference of the mixer, as well as in the area of the discharge edges of the guide blades. The outgoing flow-side ring preferably remains, just as the incoming flow-side ring, within the ends or tips of the guide blades located radially on the outside. The outgoing flow-side ring may end flush with discharge edges of the guide blades on the outgoing flow side. The outgoing flow-side ring may be integrated in the cast part with uniform material. Such an outgoing flow-side ring can likewise lead to stabilization of the mixer or of the guide blades.

In another advantageous embodiment, retaining elements may be formed, preferably integrally on the cast part, and the mixer can be attached via these retaining elements to an exhaust pipe, e.g., by means of a separate retainer. Due to the integration of such retaining elements in the cast part, the mounting of the mixer in an exhaust gas is simplified, and a retainer specially provided for this may be used.

The aforementioned retaining elements may be formed, e.g., on individual guide blades. It is equally possible to design the retaining elements according to an advantageous embodiment on the aforementioned incoming flow-side ring, as a result of which it is possible to position the retaining elements independently from the guide blades in the circumferential direction.

Preferred is an embodiment in which the respective retaining element is permanently connected with a retaining strap formed on the retainer by a weld seam prepared by means of a welding method, preferably by means of a laser welding method. A recess, into which the retaining element can be inserted in a positive-locking manner, may be provided for this on the retaining strap. The recess may have a U-shaped cross section for this, which is shaped complementarily to the cross section of the retaining element. For example, it may be a rectangular cross section, which is enclosed by an edge of the recess on three of four sides. A continuous weld seam can now be prepared along the edge of the recess by means of a welding operation in order to prepare the respective weld seam.

Provisions may be made for a simplified preparation of the welded connection for the retainer for the respective retaining element to have a retaining strap, on which a recess is formed, into which the retaining element is inserted. It is especially advantageous in this connection if a smallest possible gap or a smallest possible clearance is present along the edge of the recess between the retaining element and the retaining strap in the recess. An embodiment in which the retaining element meshes with the recess without clearance or without gap, so that the edge of the recess is essentially fully in contact with the retaining element, is therefore preferred. For example, the edge of the recess may now be in contact with the retaining element on three sides in case of a rectangular cross section. A clearance-free meshing of the retaining element with the recess can be advantageously achieved by the recess being manufactured with a close tolerance and by taking into account a draft angle of the cast part in the area of the retaining element. The retaining element can thus be introduced into the recess until it comes into contact with the retaining strap along the edge of the recess. The draft angle acts as a centering here. The clearance-free meshing of the retaining element with the recess makes it possible, in conjunction with a laser welding method, to establish a high-quality connection that can be prepared in a simple manner between the retaining element and the retaining strap.

In another advantageous embodiment, a discharge edge may be formed on at least one of the guide blades at an end area, which is bent in relation to an area of the respective guide blade that adjoins it in the upstream direction. In particular, this end area may have a smaller pitch angle than the area of the guide blade adjoining it in the upstream direction. It was found that such an end area bent in the opposite direction is advantageous in respect to the mixing of the flow and/or the flow in the mixer.

Corresponding to an alternative solution, for which patent protection is being claimed also independently from the core and/or independently from the cast part, a mixer of this class may be designed such that at least one of the guide blades has an auxiliary guide contour, which is arranged on a discharge edge of the respective guide blade in the area of a leading edge of the respective guide blade and brings about a flow deflection in the direction of an incoming flow surface of the guide blade located adjacent in the circumferential direction. The respective auxiliary guide contour preferably projects for this purpose from the respective guide blade in the direction of one of the adjacent guide blades and has a spoiler-like or ramp-like or wedge-shaped structure. If a plurality of guide blades are equipped with such an auxiliary guide contour, these always project in the circumferential direction from the guide blades on the same side, i.e., either each clockwise or alternatively counterclockwise. It is achieved by means of the auxiliary guide contours that the liquid reducing agent, which is usually introduced centrally, is deflected towards the large incoming flow-side surfaces of the guide blades and forms a precipitate there, which can easily be evaporated by the arriving exhaust gas flow.

Especially advantageous is an embodiment in which the respective auxiliary guide contour is arranged only in a radially inner area of the respective guide blade. It was found that such a deflection is not necessary in the radially outer areas of the respective guide blade to achieve sufficient evaporation, which is attributed to the fact that the volume flow of the exhaust gas flow is markedly lower radially on the inside. The flow resistance of the mixer is reduced by arranging the auxiliary guide contours only radially on the inside.

A mixing device according to the present invention, which is suitable for being installed in an exhaust system, especially in conjunction with an SCR system, comprises an exhaust pipe, whose inner wall radially defines a cross section, through which an exhaust gas flow can flow, a mixer of the above-mentioned type, as well as a separate retainer, with which the mixer is fastened to the exhaust pipe. Thus, ultimately only three components are provided, namely, the exhaust pipe, the mixer and the retainer, which can be mounted in an especially simple manner.

According to an advantageous embodiment, the mixer may be fastened to the exhaust pipe with the retainer such that an annular gap is formed radially between the mixer and the inner wall. It was found that such an annular gap is especially advantageous from an aerodynamic point of view, as a result of which the mixing device as a whole has a reduced flow resistance. The aforementioned annular gap may be formed radially between the inner wall and radially outer ends or tips of the guide blades and/or the aforementioned incoming flow-side or outgoing flow-side ring. It is, further, guaranteed by the annular gap that the mixer has no direct contact with the exhaust pipe. The mixer is rather positioned in the exhaust pipe only indirectly by means of the retainer. The mixer is extensively insulated thermally against the exhaust pipe as a result, which improves the efficiency of the mixer in terms of the evaporating effect.

The retainer may have retaining straps, which interact with retaining elements, which are provided on the mixer. The retaining straps may be interlocked with the retaining elements. Further, the retaining straps may be pressed to the retaining elements, such that a sufficient non-positive locking and/or positive locking develops due to plastic deformation.

The retainer may advantageously be designed such that it can be used for mounting the mixing device into a flange joint, with which the exhaust pipe can be connected to another component of the exhaust system. Separate fixation of the retainer on the exhaust pipe is thus eliminated, which considerably simplifies the mounting of the mixing device.

A method according to the present invention for manufacturing a mixing device for an exhaust system, characterized in that the mixer is formed as a cast part from a metallic cast material, wherein the cast part has at least one retaining element formed integrally thereon; that the retainer is made as a sheet metal part from a metallic sheet material, wherein the sheet metal part has at least one retaining strap formed integrally thereon; that the cast part and the retainer are positioned in relation to one another such that the respective retaining element meshes with the respective retaining strap; and that the respective retaining element is welded to the respective retaining strap, such that the cast material melts and becomes directly connected with the material of the sheet metal. A filler metal can thus be eliminated due to this procedure, because the cast material is connected directly with the material of the sheet metal. The welding operation is simplified hereby. In addition, it can be prepared at a lower cost. Suitable welding methods are, e.g., laser welding methods as well as a TIG welding method, where TIG denotes tungsten-inert gas.

The method being presented here is thus especially suitable for the manufacture of a mixing device of the above-described type, in which a mixer of the above-described type is used. However, this manufacturing method may, in general, also be used independently from the above-described mixing device according to the present invention and/or independently from the above-described mixer according to the present invention, as long as the mixing device has an exhaust pipe, whose inner wall defines radially a cross section through which an exhaust gas flow can flow, a mixer for mixing and/or evaporating a liquid in the exhaust gas flow and a separate retainer for fixing the mixer on the exhaust pipe.

The cast part and the retainer are advantageously positioned such that the respective retaining element and the respective retaining strap touch each other along a contact zone, along which a weld seam can then be prepared.

In particular, the respective retaining element may be in contact with an inner side of the retaining strap with an outer side without clearance after positioning along the contact zone. Especially advantageous here is an embodiment in which the respective retaining element meshes with a recess of the retaining strap in a positive-locking manner and without clearance.

It is apparent that the above-mentioned features, which will also be explained below, may be used not only in the particular combination indicated, but in other combinations or alone as well without going beyond the scope of the present invention.

Preferred exemplary embodiments of the present invention are shown in the drawings and will be explained in more detail below, and identical references designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
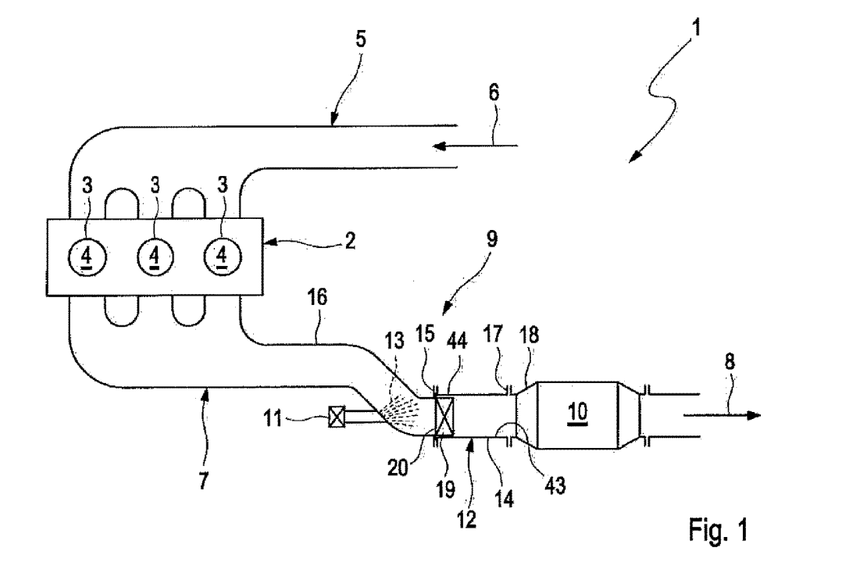
FIG. 1 is a highly simplified, circuit diagram-like schematic diagram of an internal combustion engine with an exhaust system, which contains a mixing device.

Referring to the drawings, corresponding to FIG. 1, an internal combustion engine 1, which is preferably used in a motor vehicle, comprises an engine block 2, which contains a combustion chamber 4 each in a plurality of cylinders 3, wherein pistons, not shown here, are arranged in the cylinders 3 such that they can be displaced by a stroke motion. The internal combustion engine 1 comprises, further, a fresh air feed unit 5 for feeding fresh air to the combustion chambers 4. A corresponding fresh air flow 6 is indicated by an arrow. In addition, the internal combustion engine 1 is equipped with an exhaust system 7, which is used to remove exhaust gas from the combustion chambers 4, wherein an exhaust gas flow 8 is indicated by an arrow. The exhaust system 7 is equipped here with an SCR system 9, which comprises an SCR catalytic converter 10, an injector 11 and a mixing device 12. A suitable reducing agent 13 in the liquid form can be injected into the exhaust gas flow 8 by means of the injector 11. The mixing device 12 is arranged downstream of the injector 11 and upstream of the SCR catalytic converter 10 in relation to the direction of flow of the exhaust gas in the exhaust system 7. The mixing device 12 is used to mix and/or evaporate the reducing agent 12 in the exhaust gas flow 8. A reduction of the nitrogen oxides being carried in the exhaust gas flow 8 will then take place in the SCR catalytic converter 10 by means of the reducing agent.

The mixing device 12 comprises an exhaust pipe 14, which is connected with a pipe section 16 of the exhaust system 7, on which pipe section the injector 11 is arranged, for example, via a first flanged joint 15. The exhaust pipe 14 is connected to a housing 18 of the SCR catalytic converter 10 with a second flanged joint 17. The mixing device 12 comprises, further, a mixer 19, which brings about essentially the mixing and/or evaporation of the reducing agent 13 in the exhaust gas flow 8. Furthermore, a retainer 20 is provided, by means of which the mixer 19 is fastened to the exhaust pipe 14. The retainer 20 is inserted into the first flanged joint 15 in the example according to FIG. 1, so that the retainer 20 is also fixed on the exhaust gas pipe 14 at the same time when fixing the exhaust gas pipe 14. on the pipe section 16.

According to FIGS. 2 through 7, the mixer 19 has a plurality of guide blades 21, which are arranged in a star-shaped pattern and are correspondingly arranged distributed in a circumferential direction 22. The mixer 19 comprises, further, a centrally arranged core 23, from which the guide blades 21 start. The guide blades 21 are correspondingly connected each with the core 23 radially on the inside. Furthermore, the mixer 19 is characterized by a cast part 24, which has all guide blades 21 and the core 23 as integral components. This means that the core 23 and all guide blades 21 are manufactured from one piece and form together a component having a uniform material, namely, the cast part 24.

All guide blades 21 are preferably of an identical design or identical shape. Further, the guide blades 21 are arranged in a self-supporting manner radially on the outside. The exhaust gas flow 8 can thus flow around the guide blades 21 radially on the outside.

Figure 4:
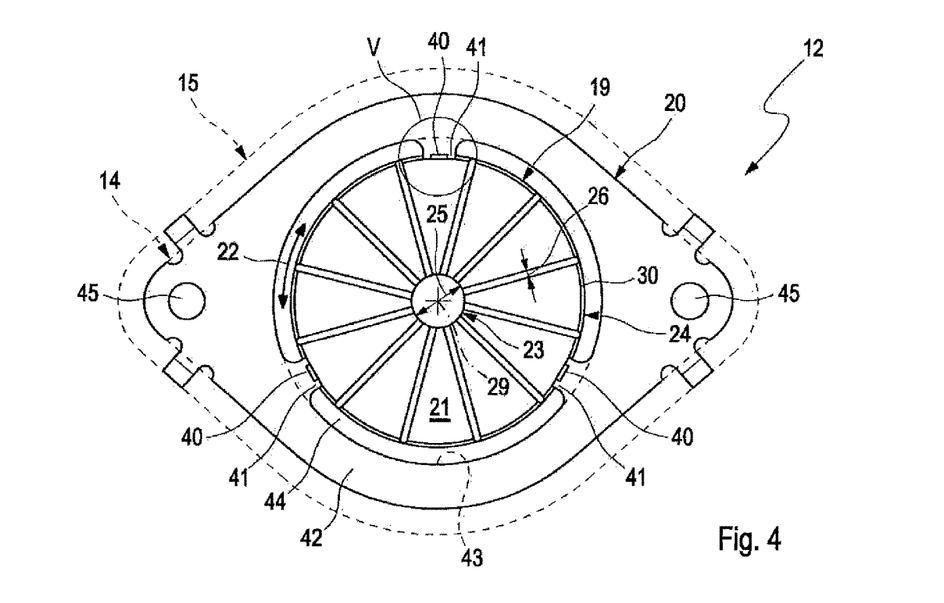
FIG. 4 is an axial view of the mixer with a retainer of the mixing device.

According to FIG. 4, the core 23 has a diameter 25 that is larger than the wall thickness 26 of the respective guide blade 21. The diameter 25 is about five times the wall thickness 26 in the example. The core 23 thus has a comparatively large mass compared to the guide blades 21 and correspondingly a relatively high heat capacity.

Figure 2:
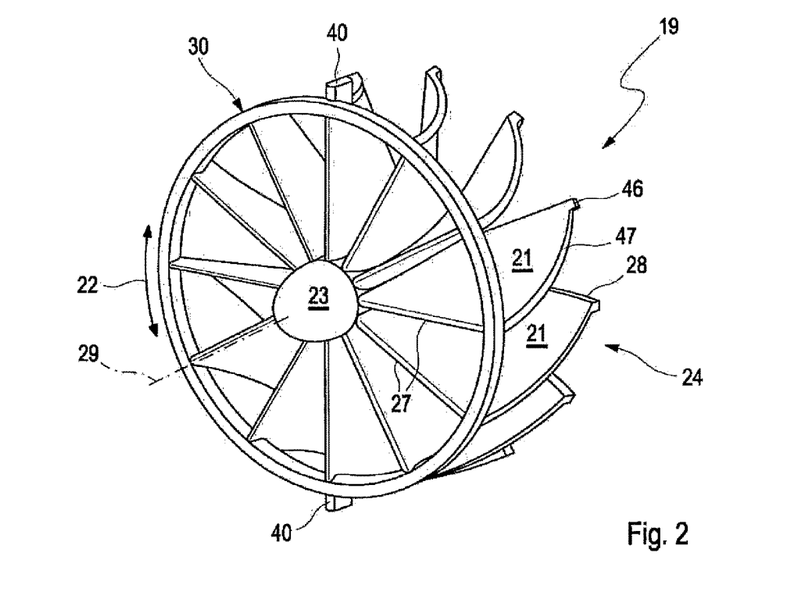
FIG. 2 is an isometric view of a mixer of the mixing device.
Figure 3:
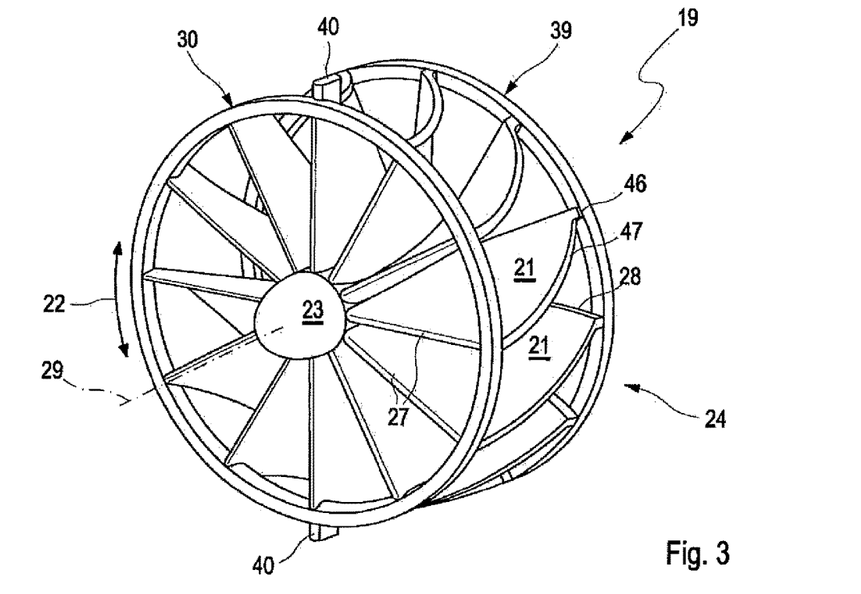
FIG. 3 is an isometric view of the mixer, but in another embodiment.

The guide blades 21 are preferably connected with the core 23 over their entire axial length radially on the inside. The guide blades 21 have a leading edge 27 as well as a discharge edge 28 each. The leading edges 27 are preferably located in an incoming flow plane, which extends at right angles to a central longitudinal axis 29 of the mixer 19. In addition, or as an alternative, the discharge edges 28 are located in an outgoing flow plane, which extends at right angles to the central longitudinal axis 29. The core 23 may project now axially over the guide blades 21 at least at an axial end of the mixer 19. The core 23 projects axially over the incoming flow-side end facing the viewer in the example being shown. The core 23 has a flowline-shaped incoming flow end.

Figure 6:
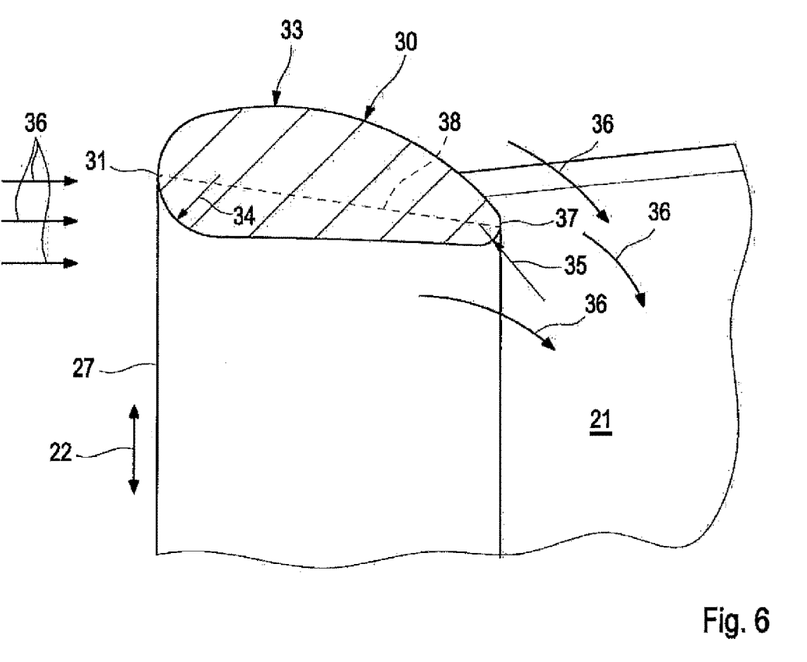
FIG. 6 is a longitudinal section of the mixer in the area of an incoming flow-side ring according to section lines VI in FIG. 5.

An incoming flow-side ring 30 is provided in the preferred examples being shown here. This incoming flow-side ring 30 is arranged in the area of an outer circumference of the mixer 19 or in the area of radially outer ends of the guide blades 21. Further, the incoming flow-side ring 30 is arranged in the area of the leading edges 27. In particular, the incoming flow-side ring 30 is formed integrally on the aforementioned cast part 24. As can be seen in FIG. 6, the incoming flow-side ring 30 may be integrated in the cast part 24 such that a leading edge 31 of the incoming flow-side ring 30 is arranged axially flush with the leading edges 27 of the guide blades 21 and/or radially flush with a radially outer end of the respective guide blade 21. The incoming flow-side ring 30 thus extends quasi through the guide blades 21 in the circumferential direction 22, as a result of which nodal areas 32, which are used by both the incoming flow-side ring 30 and the respective guide blade 21, are formed within the cast part 24.

According to FIG. 6, the incoming flow-side ring 30 preferably has a profile 33, which is measured at right angles to the circumferential direction 22 and is rounded on the incoming flow side and the outgoing flow side. An incoming flow-side rounding radius 34 is markedly larger than an outgoing flow-side rounding radius 35, as a result of which a drop shape or an aerodynamic shape is generated for the profile 33. The profile 33 is, in particular, a hydrofoil. The profile 33 is preferably shaped such that it can deflect an axially arriving exhaust gas flow 36 radially inwardly. Such a scenario is indicated by arrows in FIG. 6. The outgoing flow-side rounding radius 35 defines a discharge edge 37 of the profile 33. The aforementioned hydrofoil is obtained when the radially inner path from the leading edge 31 to the discharge edge 37 along the outer contour of the profile 33 is shorter than the radially outer path. Further, a chord 38, which connects the leading edge 31 with the discharge edge 37 within the profile 33, is set at an angle in relation to the axial direction in order to bring about the desired flow deflection towards the inside. The axial direction is defined by the central longitudinal axis 29 of the mixer 19.

According to the embodiment shown in FIG. 3, an outgoing flow-side ring 39, which is arranged in the area of the discharge edges 28 as well as in the area of an outer circumference of the mixer 19 or in the area of the radially outer ends of the guide blades 21, may be provided, besides, in addition to the incoming flow-side ring 30. It is possible in this case as well to form the outgoing flow-side ring 39 integrally in the cast part 24. Further, a discharge edge of the outgoing flow-side ring 39 may end flush with the discharge edges 28 of the guide blades 21 and/or with the radially outer ends of the guide blades 21.

Retaining elements 40, via which the mixer 19 can be fastened on the exhaust pipe 14 by means of the aforementioned retainer 20, may be formed on the cast part 24. For example, two such retaining elements 40, which project radially outwardly and may start from a guide blade 21 each, are provided in the embodiments shown in FIGS. 2 and 3. The two retaining elements 40 are preferably arranged diametrically opposite each other. It is possible, in principle, to fix the mixer 19 directly on the exhaust pipe 14 even without a retainer 20 by means of such, radially projecting retaining elements 40.

Figure 5:
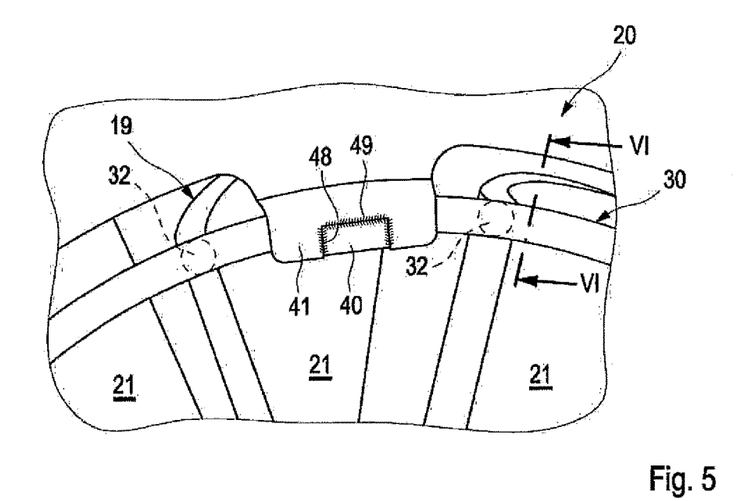
FIG. 5 is an enlarged detail V from FIG. 4.

By contrast, FIGS. 4 and 5 show an embodiment in which, for example, three retaining elements 40 are provided, which project axially and are arranged uniformly distributed in the circumferential direction 22. The retaining elements 40 are arranged or formed integrally on the incoming flow-side ring 30. The aforementioned retainer 20 may be preferably used in case of these retaining elements 40, and said retainer 20 has for this purpose, for example, retaining straps 41, which are shaped and arranged complementarily to the retaining elements 40 and which make it possible to establish a permanent connection with the retaining elements 40. For example, a locking connection is conceivable here, in which the retaining elements 40 interlock the retaining straps 41 in order to create a positive-locking connection in the axial direction and the radial direction between the mixer 19 and the retainer 20. It is likewise possible that the retainer 20 is welded to the retaining elements 40 in the area of the retaining straps 41 in order to fix the mixer 19 on the retainer 20. Further, a plastic deformation of the retaining straps 41 and/or of the retaining elements 40 is conceivable in order to generate a sufficient fixation between the mixer 19 and the retainer 20.

However, an embodiment in which the respective retaining element 40 is welded to the corresponding retaining strap 41 is preferred. A recess 48, into which the retaining element 40 can be inserted in a positive-locking manner, is provided for this on the retaining strap 41. The recess 48 has a U-shaped cross section for this, which is shaped complementarily to the cross section of the retaining element 40. The cross section is a rectangular cross section in the example, which is enclosed by an edge of the recess 48 on three of four sides. A continuous weld seam 49 can now be prepared along the edge of the recess 48 by means of a welding operation in order to connect the retaining element 40 with the retaining strap 41. The use of a laser welding method for preparing the respective weld seam 49 proved to be especially advantageous in this connection.

Provisions may be made for the simplified preparation of the weld joint for the smallest possible gap or the smallest possible clearance to be present in the recess 48 along the edge of the recess 48 between the retaining element 40 and the retaining strap 41. Preferred is an embodiment in which the retaining element 40 meshes with the recess 48 without clearance or without a gap, so that the edge of the recess 48 is essentially completely in contact with the retaining element 40. The edge of the recess 48 is now in contact in the example with the retaining element 40 on three sides. A clearance-free meshing of the retaining element 40 with the recess 48 can be advantageously achieved by the recess 48 being manufactured with a close tolerance and by a draft angle of the cast part 24 being taken into account in the area of the retaining element 40. The retaining element 40 can thus be inserted into the recess 48 in a simple manner until it comes into contact with the retaining strap 41 along the edge of the recess 48. The draft angle acts as a centering. The clearance-free meshing of the retaining element 40 with the recess 48 makes it possible, in conjunction with a laser welding method, to establish an especially high-quality connection, which can be prepared in a simple manner, between the retaining element 40 and the retaining strap 41.

As can be seen especially in FIGS. 4 and 5, the retaining straps 41 may project radially inwardly from a ring area 42 of the otherwise disk-shaped retainer 20 in the preferred example being shown here. This mode of construction makes it possible, in particular, to retain the mixer 19 in the exhaust pipe 14, which is indicated by broken line in FIG. 4, in such a way that an annular gap 44, which surrounds the mixer 19 completely and in a closed manner in the circumferential direction 22, can form radially between the mixer 19 and an inner wall 43 of the exhaust pipe 14. Thus, there is no radial contact between the mixer 19 and the exhaust pipe 14. At the same time, it is achieved hereby that the flow can flow around the incoming flow-side ring 30 radially on the outside. The flow can also flow radially on the outside around the guide blades 21, which are arranged in a self-supporting manner radially on the outside. On the whole, this leads to an especially low flow resistance for the mixer 19.

A method for manufacturing the mixing device 12 for the exhaust system 7, wherein the mixing device 12 has at least the exhaust pipe 14, whose inner wall 43 defines radially the cross section through which the exhaust gas flow 8 can flow; the mixer 19 for mixing and/or evaporating the liquid 13 in the exhaust gas flow 8, and a separate retainer 20 for fixing the mixer 19 on or in the exhaust pipe 14, is carried out accordingly as follows:

The mixer 19 and the retainer 20 are manufactured first. The mixer 19 is made as a cast part 24 from a metallic cast material, such that the cast part 24 has at least one such retaining element 40 as a component formed integrally thereon. Contrary to this, the retainer 20 is made as a sheet metal part from a metallic sheet metal material, such that the sheet metal part has at least one such retaining strap 41 as a component formed integrally thereon. The cast part 24 and the retainer 20 are subsequently positioned relative to one another such that the respective retaining element 40 meshes with the respective retaining strap 41. The respective web-like retaining element 40 meshes, in particular, in a positive-locking manner and without clearance with the recess 48 of the respective retaining strap 41. The respective retaining element 40 is subsequently welded to the respective retaining strap 41, such that the cast material melts and becomes directly connected with the material of the sheet metal. The welding method is thus carried out without the use of a filler metal.

As can also be seen in FIG. 4, the retainer 20 can be integrated in the aforementioned first flanged joint 15 in an especially simple manner. In particular, passage openings 45, through which screws, not shown here, with which the flanges of the exhaust pipe 14 and of the pipe section 16 are fixed to one another within the first flanged joint 15, may be provided on the retainer 20.

According to FIG. 2, the discharge edges 28 in the guide blades 21 are formed each in an end area 46, which is bent out from an area 47 of the respective guide blade 21, which said area 47 adjoins said end area 46 in the upstream direction. In particular, the bending is effected in a direction that is oriented opposite the pitch angle of the area 47 joining it. In particular, the end area 46 may be oriented axially, i.e., it may have a pitch angle of 0°. The discharge edge 28 is preferably formed on such a bent end area 46 in all guide blades 21.

Figure 7:
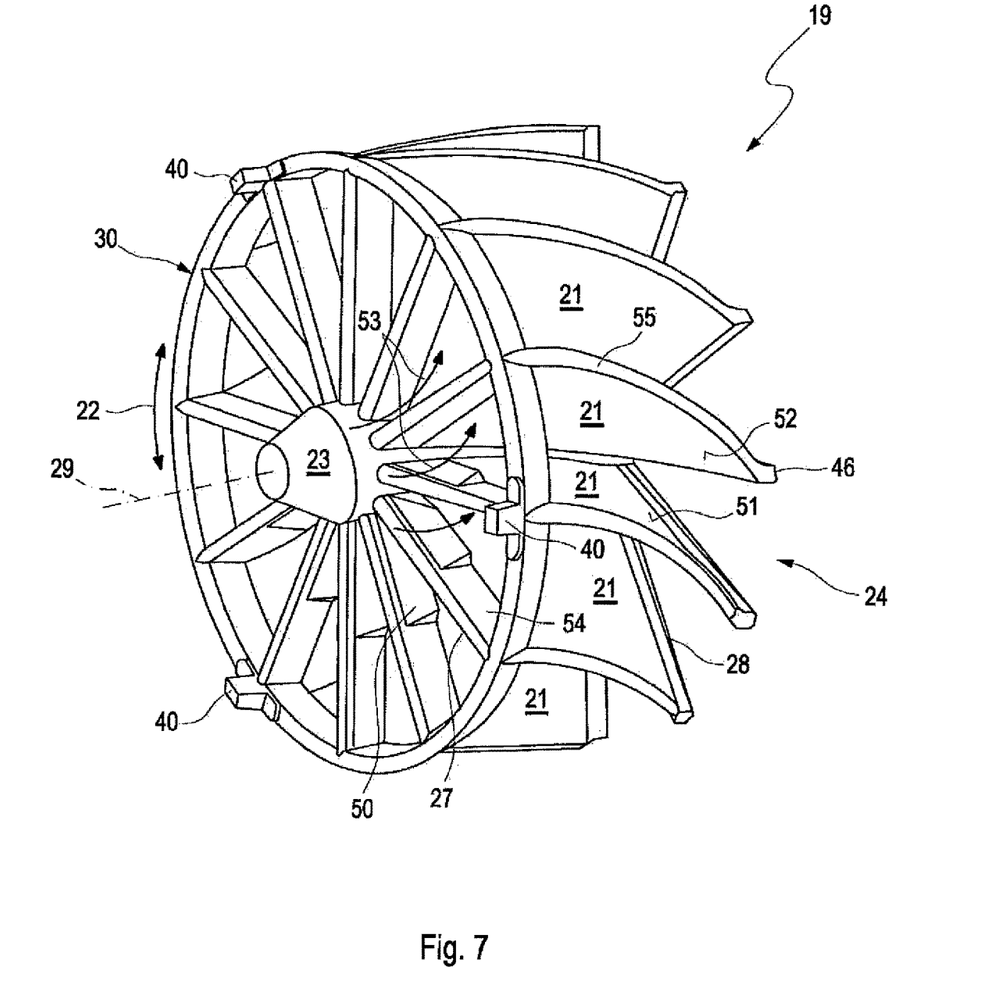
FIG. 7 is an isometric view of the mixture in another embodiment.

Some, preferably all guide blades 21 are equipped according to FIG. 7 with an auxiliary guide contour 50 each, which are arranged on an outgoing flow surface 51 of the respective guide blade 21 in the area of the leading edge 27 of the respective guide blade 21. The auxiliary guide contours 50 are arranged for this such that they deflect an exhaust gas flow from the respective guide blade 21 in the circumferential direction 22 against the respective adjacent guide blade 21 during the operation of the mixer 19 or during the operation of the exhaust system 7 equipped with the mixer 19. Flow arrows, which symbolize this deflection, are designated by 53 in FIG. 7.

The auxiliary guide contours 50 project from the outgoing flow surface 51 of the respective guide blade 21 in a ramp-shaped manner in the direction of an incoming flow surface 52 of the guide blade 21 located adjacent in the circumferential direction. The outgoing flow surface 51 of the respective guide blade 21 is the same surface of the guide blade 21 that faces away from an arriving exhaust gas flow, i.e., is arranged on the leeward side in relation hereto, during the operation of the mixer 19 or during the operation of the exhaust system 7 equipped with the mixer 19. Contrary to his, the incoming flow surface 52 of the respective guide blade 21 is formed by the surface of the guide blade 21 that faces said arriving exhaust gas flow, i.e., is arranged on the windward side in relation hereto. The leeward side is known to be arranged in the shadow of the arriving flow, while the windward side is directly exposed to the arriving flow.

The auxiliary guide contours 50 are preferably arranged in a radially inner area of the respective guide blade 21 only. The auxiliary guide contours 50 adjoin the core 23 in the example and extend over about 50% of the radial dimension of the respective guide blade 21. The area over which the respective auxiliary guide contour 50 extends starting from the core 23 along the respective guide blade 21 is preferably between 30% and 70% and especially between 40% and 60% of the radial dimension of the respective guide blade 21. The ramp shape of the respective auxiliary guide contour 50 has a wedge-shaped profile, such that it tapers to a tip towards the incoming flow-side axial end of the mixer 19.

The respective auxiliary guide contour 50 extends in the axial direction only in an axial section 54 of the respective guide blade 21 adjoining the leading edge 27 of the respective guide blade 21. According to a preferred embodiment, the respective guide blade 21 may not yet have a pitch in relation to the axial direction in this incoming flow-side axial section 54, so that this axial section 54 extends in parallel to the central longitudinal axis 29. The respective guide blade 21 has a pitch, i.e., a pitch angle different from zero in relation to the axial direction, only in a curved area 55 adjoining this axial section 54.

While specific embodiments of the invention have been shown and described in detail to illustrate the application of the principles of the invention, it will be understood that the invention may be embodied otherwise without departing from such principles.

What is claimed is:

1. A mixer for an exhaust system for at least one of mixing and evaporating a liquid in an exhaust gas flow, for an SCR system, the mixer comprising:
   a centrally arranged core;
   a plurality of guide blades, the guide blades each having a leading edge and a discharge edge and being connected, at a radially inner side, with the centrally arranged core and extending radially outward from the centrally arranged core for thereby providing a star-shaped pattern, wherein at least one of the guide blades has said discharge edge at an end area bent, at an angle in relation to an area of the respective guide blade adjoining the end area in an upstream direction towards the leading edge of the at least one of the guide blades such that the end area has a smaller pitch angle than the area adjoining the end area in the upstream direction;
   further comprising an incoming flow-side ring connected with all guide blades at leading edges thereof.

2. A mixer in accordance with claim 1, wherein the guide blades are arranged, radially on an outside, in a self-supporting manner.

3. A mixer in accordance with claim 1, wherein the core has a diameter that is larger than a wall thickness of at least one of the guide blades.

4. A mixer in accordance with claim 1, wherein an entire axial length of each of the guide blades is connected with the core.

5. A mixer in accordance with claim 1, wherein the core projects axially over the guide blades at at least one axial end of the mixer.

6. A mixer in accordance with claim 1, further comprising wherein the guide blades and the core are formed as an integral cast part.

7. A mixer in accordance with claim 6, wherein the incoming flow-side ring is formed integrally on the cast part.

8. A mixer in accordance with claim 6, wherein at right angles to a circumferential direction, the incoming flow-side ring has a profile, which is rounded on the incoming flow side and the outgoing flow side and has a larger rounding radius on the incoming flow side than on the outgoing flow side.

9. A mixer in accordance with claim 1, further comprising an outgoing flow-side ring connected with all guide blades at the discharge edges thereof.

10. A mixer in accordance with claim 1, further comprising:
    a separate retainer; and
    retaining elements formed on the cast part, wherein via the retaining elements the mixer can be fastened to an exhaust pipe by the separate retainer.

11. A mixer in accordance with claim 10, wherein the retaining elements are formed on the incoming flow-side ring.

12. A mixer in accordance with claim 10, wherein:
    the retainer is formed with retaining straps;
    each of the respective retaining elements is permanently connected with one of the retaining straps by a weld seam prepared by a laser welding method.

13. A mixer in accordance with claim 10, wherein the retainer for the respective retaining elements has retaining straps, each of the retaining straps having a recess into which the retaining element is inserted without clearance.

14. A mixer in accordance with claim 1, wherein:
    each guide blade has an outgoing flow surface at one circumferential side thereof and an ingoing flow surface of the other circumferential side thereof;
    at least one of the guide blades has an auxiliary guide contour;
    the auxiliary guide contour is arranged at the outgoing flow surface of the at least one guide blade in an area of a leading edge of the respective guide blade and projects in a direction of the incoming flow surface of the guide blade located adjacent in a circumferential direction.

15. A mixer in accordance with claim 14, wherein the respective auxiliary guide contour is arranged only in a radially inner area of the respective guide blade such as to extend only in a radial inner portion of the guide blade and not in a radial outer portion of the guide blade.

16. A mixing device for an exhaust system, the mixing device comprising:
- an exhaust pipe comprising an inner wall defining a radially extending cross section through which an exhaust gas flow can flow;
- a mixer comprising:
  - a centrally arranged core;
  - a plurality of guide blades,
    - the guide blades each having a leading edge and a discharge edge and being connected, at a radially inner side, with the centrally arranged core and extending radially outward from the centrally arranged core for thereby providing a star-shaped pattern, wherein at least one of the guide blades has said discharge edge at an end area bent, at an angle in relation to an area of the respective guide blade adjoining the end area in an upstream direction towards the leading edge of the at least one of the guide blades such that the end area has a smaller pitch angle than the area adjoining the end area in the upstream direction; further comprising an incoming flow-side ring connected with all guide blades at leading edges thereof;
- a separate retainer, with which the mixer is fastened to the exhaust pipe.

17. A mixing device in accordance with claim 16, wherein the mixer is fastened to the exhaust pipe by the separate retainer such that an annular gap is formed radially between the mixer and the inner wall.

18. A mixing device in accordance with claim 16, wherein the retainer is inserted into a flanged joint, with which the exhaust pipe is connected in the installed state to another component of the exhaust system.

19. A mixing device in accordance with claim 16, further comprising wherein the guide blades and the core are formed as an integral cast part.

20. A mixer for an exhaust system for at least one of mixing and evaporating a liquid in an exhaust gas flow, for an SCR system, the mixer comprising:
- a centrally arranged core comprising a longitudinal axis;
- a plurality of guide blades, each of the guide blades having a leading edge and a discharge edge, each of the guide blades being connected, at a radially inner side, with the centrally arranged core and each of the guide blades extending radially outward from the centrally arranged core with respect to the longitudinal axis to define a star pattern of the plurality of guide blades, wherein the guide blades are integrally connected to the core to define a one-piece guide blades and core structure, wherein at least one of the guide blades comprises an end area and a blade area, the blade area being directly adjacent to the end area, the discharge end being located at the end area, the discharge end being bent at an angle relative to the blade area, the blade area extending in a direction upstream of the discharge end, with respect to the exhaust gas flow, towards the leading edge of the at least one of the guide blades, the end area having an end area pitch angle, the blade area having a blade area pitch angle, the end area pitch angle being less than the blade area pitch angle; further comprising an incoming flow-side ring connected with all guide blades at leading edges thereof.

21. A mixer in accordance with claim 20, wherein each of the plurality of guide blades has an overall guide blade pitch angle, the overall guide blade pitch angle decreasing from the leading edge to the discharge edge.

* * * * *